United States Patent Office 3,682,776
Patented Aug. 8, 1972

3,682,776
PRESERVATION OF ORGANS, TISSUES, AND FOODSTUFFS BY MEANS OF BIOLOGICAL PROTEASE INHIBITORS
Ekkehard Grundmann and Gunther Schmidt-Kastner, Wuppertal-Elberfeld, Germany, assignors to Farbenfabriken Bayer Aktiengesellschaft, Leverkusen, Germany
No Drawing. Filed Feb. 18, 1970, Ser. No. 12,429
Claims priority, application Germany, Feb. 27, 1969, P 19 09 965.1
Int. Cl. A01n 1/02; A23b 1/14
U.S. Cl. 195—1.7
11 Claims

ABSTRACT OF THE DISCLOSURE

Organs, particularly those intended for use in transplantations, such as the human liver, as well as tissues and foodstuffs are preserved by contact with biological protease-inhibitors, such as kallikrein-trypsin inhibitor or potato inhibitor, preferably in the form of an aqueous solution.

BACKGROUND OF THE INVENTION

Field of the invention

The present invention is directed to the storage and preservation or organic matter such as animal organs and tissues as well as foodstuffs. More particularly, the invention is concerned with the storage of living animal organs and tissues intended for transplantations.

When storing organs and tissues, particularly those intended to be used for transplantations, difficulties frequently arise caused by the fact that these organs and tissues are more or less destroyed by post-mortem autolysis and consequently become useless for the aforementioned purpose. Fungi and bacteria containing proteases can also have the same deleterious effect. Similar conditions prevail in the case of foodstuffs which can also be rendered useless by the action of proteases.

Description of the prior art

It is true that the above-mentioned undesirable effects can be obviated more or less by known preservatives, but the disadvantage of these methods is that many of the customary preservatives are not well tolerated by the organism.

SUMMARY

It has now been found that organs, tissues and foodstuffs can be preserved by biological protease-inhibitors.

These biological protease-inhibitors have the great advantage that they are accepted by the organism virtually without any complications. Most importantly, however, they have the desired preserving effect in a high degree.

In this connection, the term biological protease-inhibitors comprises inhibitors obtained from animal organs, particularly the known kallikrein-trypsin inhibitor, but also the protease-inhibitors of vegetable origin, e.g. obtained from potatoes and leguminoses.

Organs and tissues which can be preserved according to the invention are primarily the liver, kidney, heart, pancreas, lung, skin and bone marrow.

The above-mentioned inhibitors are preferably used in aqueous solutions. The organs, tissues and foodstuffs to be preserved can be placed into these aqueous solutions, but it is also possible to inject the aqueous solutions into these organs, etc., or to allow them to flow through the organs. It is moreover, also feasible to bring the inhibitors in the solid form and where necessary, with carrier substances, into contact with the organs to be preserved.

When aqueous solutions are used for carrying out the preservation according to the invention, even low concentrations are sufficient for attaining the desired effect. However, dependent upon special instances it may also be found expedient to use higher concentrations.

DESCRIPTION OF PREFERRED EMBODIMENTS

Example I.—Fresh kidneys of healthy rats are removed and divided in two parts by a center section. The one group of the kidney halves is placed into a physiological common salt solution and the other half into a common salt solution mixed with the kallikrein-trypsin inhibitor (KTI) at a concentration of 8 mg. per millilitre. The kidney halves are stored in these solutions at room temperature under sterile conditions, removed under sterile conditions at different times after the start of the experiment and examined for their intact state by means of histological routine methods as well as by methods of ferment-histochemistry. The tissue pieces are either cut on the cryostat for the special ferment-histochemistry, or fixed with neutrally buffered formalin or according to Wolman. The Wolman fixed material is embedded in paraffin over methyl benzoate and used for routine histology. The material fixed in formalin is freeze-cut and serves for the preparation of hydrolases.

The following ferments are prepared: NADH-cytochrome-c-reductase (NADH-C-R), lactate dehydrogenase (LDH), glucose - 6 - phosphate-dehydrogenase (G6PDH), succino - dehydrogenase (SDH), cytochromoxydase (CO), unspecified esterases (UE), alkaline phosphateses (AP) and acidic phosphatases (SP). The histochemical analyses of the hydrolases are carried out according to A. G. E. Pearse ["Histochemistry; Theoretical and Applied," 3rd edition; J. a. A. Churchill Ltd. (London, 1968)], and those of the other enzymes according to T. Barka and P. J. Anderson ["Histochemistry; Theory, Practice, and Bibliography;" Harper and Row, Publishers, Inc.; New York (1963)]. Histological staining is carried out by haematoxylineosin staining (HE) and the Goldner staining.

The plasma was substantially weaker stained with HE after 6 hours' incubation in a physiological common salt solution; the tubulus cells have a swollen appearance. A strong loosening takes place throughout the whole tissue. The activity of LDH, NADH-C-R and SDH has not yet unequivocally decreased but there are already irregularities of form and density of the granula. With G6PDH similar changes are observed, expecially in the juxtamedullary zone. The CO analysis results in a spotty staining. With UE an irregular distribution and coagulation of the staining matter take place in the tubular apparatus; the activity in the marrow has decreased. Staining of SP leads to a reduced activity and to coarser granulation.

After storage for 6 hours in a KTI solution, only a small loss in staining capability is incurred with HE, but a clear preparation always results; swelling is hardly observed. The lumina of the tubuli have a sharper line of demarcation. Staining of the above-mentioned enzymes generally do not deviate from the normal picture. The activity is strong and evenly distributed. The dye granular are generally well preserved.

After 24 hours further progressing of the autolysis is found without KTI. The nuclei become dim and the bulk of them can no longer be stained, particularly in the inner sections of the tissue pieces. The tubuli exhibit only thin walls. The lumen has no longer a compact appearance. The whole tissue range shows the start of disintegration phenomena; also the interstitial connecting tissue is substantially disintegrated. After staining for LDH, $$NADH = C = R$$

SDH and CO, the dye particles are agglomerated giving a homogeneous mass and the nuclei are no longer clearly demarcated. The activity of G6PDH is substantially reduced. The UE's have completely disappeared. The AP's are partly still present with a strong activity, but only in the form of agglomerated blots. The SP's have a homogeneous stain with a strongly reduced activity.

The nuclear structures are almost all still well preserved after 24 hours under KTI action. It is true that first symptoms of a beginning autolysis become noticeable, but the tissue has a compact appearance, and the interstitium is still well preserved. The dye distribution of the stained enzymes is generally more even. The activity is substantially better preserved. However, a decreasing tendency of the G6PDH can already be recognized, and the UE's can no longer be detected. The difference in comparison with the control without KTI is particularly noticeable in the case of the SP's whose activity and structure are still well preserved.

Complete decomposition occurs without KTI after 5 days. The preparation is almost colourless with HE and only isolated nuclei are still noticeable. Contours are no longer recognizable. Staining for LDH and $$NADH=C=R$$

only results in homogeneous masses. CO and AP are no longer to be detected. The SP's still show an activity, but without structuring.

After storing for 5 days with KTI clear structures of the cortex tissue are still recognizable; the tubuli have substantially maintained their form. Staining for LDH and $NADH=C=R$ still shows a clear granulation. In the case of the LDH-staining, the glomeruli are still demarcated by their negativity. CO is still clearly detectable. The activity of the SP's is stronger and better distributed than that of the controls.

Example II.—Liver tissue of healthy rats is cut into cubes of 5 mm. edge length and stored as in Example 1 in a common salt solution with and without the addition of KTI. Further processing and examination is carried out as described in Example I.

Patchy activity reductions are found after 6 hours with LDH, $NADH=C=R$ and SDH. In most of the cells the G6PDH is substantially reduced; however, structuring and negativity of the nuclei are still preserved. In the case of the UE's spotty precipitates occur. In the case of the SP's the demarcation of the capillaries is indistinct and the activity appears to be unevenly distributed. After storage for 6 hours in a KTI-containing solution, LDH, $NADH=C=R$, SDH and G6PDH do not yet exhibit any change. The UE's have less precipitates. The SP's are more sharply demarcated and more evenly distributed than those of the controls.

Decomposition of the structure takes place after 24 hours without KTI. The lobes are no longer distinctly demarcated; the sinus have an irregular demarcation and exhibit deep indentations. The activity of LDH, $$NADH=C=R$$

SDH and especially G6PDH has been reduced. When staining for SP, a beginning decomposition of the canaliculus system becomes evident, besides a strong reduction in activity. After a 24-hours' storage in a KTI solution, the demarcation of the lobes and sinus is more regular. The activity of LDH, $NADH=C=R$, SDH and G6PDH is, in general, comparatively still strong. Also after staining for SP, the activity is still substantially stronger and the canaliculus systems appear to be better preserved.

After 5 days, without KTI, an activity of minimum homogeneity or spotty appearance is found in the case of LDH, $NADH=C=R$ and SDH. Only the SP's still exhibit a moderate dye charge. A certain decomposition of structure has now set in, even when stored in a KTI solution. However, LDH, $NADH=C=R$ and SDH still show a marked activity. The activity of SP is substantially stronger than that of the controls.

Example III.—2 to 4 ml. bone marrow are removed from the human sternum by means of a puncture cannula. The bone marrow is suspended in double its volume of a tyrode solution to which, per millilitre, 15 mg. kallikrein/trypsin inhibitor are added. The suspension is stored at about $-20°$ C. When, after one year, the suspension is compared with a corresponding suspension of bone marrow cells which were prepared without the addition of an inhibitor, but otherwise in the same manner, there are found in this suspension, after staining with trypan blue or eosin, more dead cells than in that according to the invention.

Example IV.—A human liver intended to be used for transplantation is perfused through the portal vein and arteria hepatica with a tyrode solution to which, per millilitre, 10 mg. potato inhibitor are added. The liver tissue remains in a better state than that of another liver which was not treated. The histologically visible autolytical changes are clearly kept back.

What is claimed is:

1. A process for preserving living animal organs which comprises contacting said organs outside of the body of said animal with a preserving amount of a biological protease inhibitor selected from the group consisting of kallikrein trypsin inhibitors and potato inhibitors.

2. A process according to claim 1 wherein the biological protease inhibitor is in an aqueous solution.

3. A process according to claim 2 wherein the animal organ is the liver.

4. A process according to claim 2 wherein the animal organ is the kidney.

5. A process according to claim 2 wherein the animal organ is the heart.

6. A process according to claim 2 wherein the animal organ is the pancreas.

7. A process according to claim 2 wherein the animal organ is the lung.

8. A process according to claim 2 wherein the animal organ is the skin.

9. A process for preserving animal tissues which comprises contacting said tissues outside the body of said animal with a preserving amount of biological protease inhibitor selected from the group consisting of kallikrein-trypsin inhibitors and potato inhibitors.

10. A process according to claim 9 wherein the biological protease inhibitor is in an aqueous solution.

11. A process according to claim 10 wherein the animal tissue is the bone marrow.

References Cited

UNITED STATES PATENTS 2,490,951  12/1949  Dunkley _____ 99—157

FOREIGN PATENTS 500,610  5/1954  Canada _____ 99—157
515,481  12/1939  Great Britain _____ 99—157

OTHER REFERENCES

Drug Trade News, vol. 38, No. 10, p. 62, May 13, 1963.

RICHARD L. HUFF, Primary Examiner

U.S. Cl. X.R.

99—157; 424—3, 75; 21—58